United States Patent [19]
Rosenfeld

[11] Patent Number: 5,967,054
[45] Date of Patent: Oct. 19, 1999

[54] REMOVABLE CARGO SHELF ASSEMBLY FOR A VEHICLE

[75] Inventor: Timothy D. Rosenfeld, Hacienda Heights, Calif.

[73] Assignee: R & G Ventures, LLC, Irvine, Calif.

[21] Appl. No.: 08/640,338

[22] Filed: Apr. 30, 1996

[51] Int. Cl.⁶ ....................................................... A47B 5/00
[52] U.S. Cl. .............................. 108/44; 108/48; 108/157; 108/64; 108/115; 5/118
[58] Field of Search ................................ 108/44, 48, 134, 108/135, 115, 128, 157, 64; 297/135, 163, 188.01, 146; 296/37.8, 37.16; 224/275, 277, 400, 543, 282; 5/118, 38, 42.1

[56] References Cited

U.S. PATENT DOCUMENTS

| | | | |
|---|---|---|---|
| 2,580,618 | 1/1952 | Terrell | 108/134 X |
| 2,650,374 | 9/1953 | Pierce | 108/44 X |
| 2,750,243 | 6/1956 | Zielfeldt | 108/115 X |
| 2,889,097 | 6/1959 | Broehl | 224/42 |
| 2,934,248 | 4/1960 | Lown | 224/42 |
| 3,217,673 | 11/1965 | Knoblock | 108/157 |
| 3,291,520 | 12/1966 | Smith | 296/24 |
| 3,915,100 | 10/1975 | Sullivan | 108/64 |
| 4,351,555 | 9/1982 | Hashimoto | 296/37 |
| 4,443,034 | 4/1984 | Beggs | 296/65 |
| 4,473,250 | 9/1984 | Truex et al. | 296/37.16 |
| 4,834,332 | 5/1989 | Vanderbilt | 108/48 X |
| 4,962,709 | 10/1990 | Huber | 108/44 |
| 5,427,289 | 6/1995 | Ostor | 224/282 X |
| 5,505,513 | 4/1996 | Carsner | 5/118 X |

FOREIGN PATENT DOCUMENTS

| | | | |
|---|---|---|---|
| 1573884 | 12/1967 | France | 108/44 |
| 2498133 | 7/1982 | France | 108/44 |

Primary Examiner—Peter M. Cuomo
Assistant Examiner—Janet M. Wilkens

[57] ABSTRACT

A removable cargo shelf assembly for a vehicle includes a platform assembly, a removable frame assembly and an elongated member. The platform assembly includes at least one panel. The removable frame assembly includes support means for maintaining that at least one panel in a first substantially horizontal position at a desired elevation relative to the floor of the vehicle. The elongated member is operably engageable with the panel for maintaining the panel in a second stowed position.

12 Claims, 7 Drawing Sheets

REMOVABLE CARGO SHELF ASSEMBLY FOR A VEHICLE

BACKGROUND OF THE INVENTION

1. Field of the Invention

The present invention relates to platforms and shelves for vehicles and more particularly to a removable cargo shelf assembly for the rear cargo area of a vehicle.

2. Description of the Related Art

Mini-vans, utility vehicles, recreational and conventional vehicles may have large cargo areas which are under-utilized because of an inability to adapt the area to a user's needs.

Several deck/panel systems have been proposed to enhance the utility of the cargo space of vehicles. For example, U.S. Pat. No. 4,962,709, issued to R. L. Huber, discloses an auxiliary vehicle deck. The deck includes tubular legs that are attached to the lower surface of the deck.

U.S. Pat. No. 4,351,555, issued to A. Hashimoto, relates to a foldable panel for an automobile vehicle in which two plates are interconnected via hinge pins each having two parallel spindles which are respectively rotatably received in cylindrical envelopes formed in reinforcing members fixedly attached to the plates.

U.S. Pat. No. 4,443,034, issued to G. Beggs, discloses a folding platform for a vehicle comprising a first series of panels and a second series of panels which may be unfolded within the vehicle to form load carrying shelves or a platform which may be used to support a mattress. The first series of panels, one of which is affixed to a shaft, rotate as a unit with a shaft.

U.S. Pat. No. 3,291,520, issued to A. M. Smith discloses a storage deck for a vehicle which comprises opposed ledge-forming members fixedly secured to sidewalls at a level spaced upwardly above the storage deck.

U.S. Pat. No. 2,934,248, issued to J. A. Lown, discloses the use of guide blocks for sliding a platform in and out.

U.S. Pat. No. 2,889,097, issued to C. W. Broehl, discloses the use of brackets affixed to the automobile to support an auxiliary surface.

The aforementioned devices are generally bulky and often require various forms of permanent attachment to the automobile.

OBJECTS AND SUMMARY OF THE INVENTION

It is therefore a principal object of the present invention to provide a shelf to more efficiently utilize the rear cargo area of a vehicle.

Another object of the present invention is to provide a large platform when the rear seat is folded down.

It is yet another object of the present invention to provide a cargo shelf assembly which can be folded within the rear cargo area to utilize the full height of the rear cargo area when so desired.

It is still another object of the present invention to provide a cargo shelf assembly which may easily be removed from the vehicle when not in use.

It is still another object of the present invention to provide a cargo shelf assembly which is lightweight, inexpensive and capable of being utilized within the vehicle without attachment thereto.

These and other objects are achieved by the removable cargo shelf assembly of the present invention. In its broadest aspects, the present invention comprises a platform assembly, a removable frame assembly, and retaining means. The platform assembly includes at least one panel. The removable frame assembly includes support means for maintaining that at least one panel in a first substantially horizontal position at a desired elevation relative to the floor of the vehicle. The retaining means is operably engageable with the at least one panel for maintaining that at least one panel in a second stowed position. Thus, the present invention maximizes the available storage capacity of the vehicle and enhances its utility without altering the vehicle in any manner.

Other objects, advantages, and novel features will become apparent from the following detailed description of the invention when considered in conjunction with the accompanying drawings.

BRIEF DESCRIPTION OF THE DRAWINGS

The same parts or elements throughout the drawings are designated by the same reference characters.

DETAILED DESCRIPTION OF THE PREFERRED EMBODIMENTS

Figure 1:
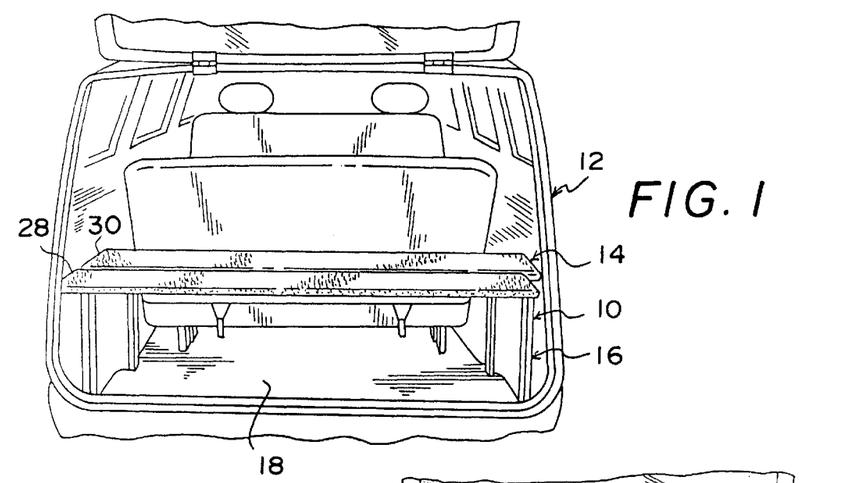
FIG. 1 is a rear view of a vehicle with its tailgate open and a removable cargo shelf assembly, which embodies the present invention, in the vehicle's rear cargo space.

Referring now to the drawings and the characters of reference marked thereon, FIG. 1 illustrates a first embodiment of the present invention, designated generally as 10 shown in place in the rear cargo space of a vehicle, designated generally as 12. The vehicle 12 for which the present invention may be utilized may be, for example, a mini-van, utility vehicle, recreational vehicle or even a conventional vehicle. The cargo shelf assembly includes a platform assembly, designated generally as 14 and a removable frame assembly, designated generally as 16. In the position shown in FIG. 1, the platform assembly 14 is maintained in a horizontal position at a desired elevation relative to the floor 18 of the vehicle 12.

Figures 4, 5:
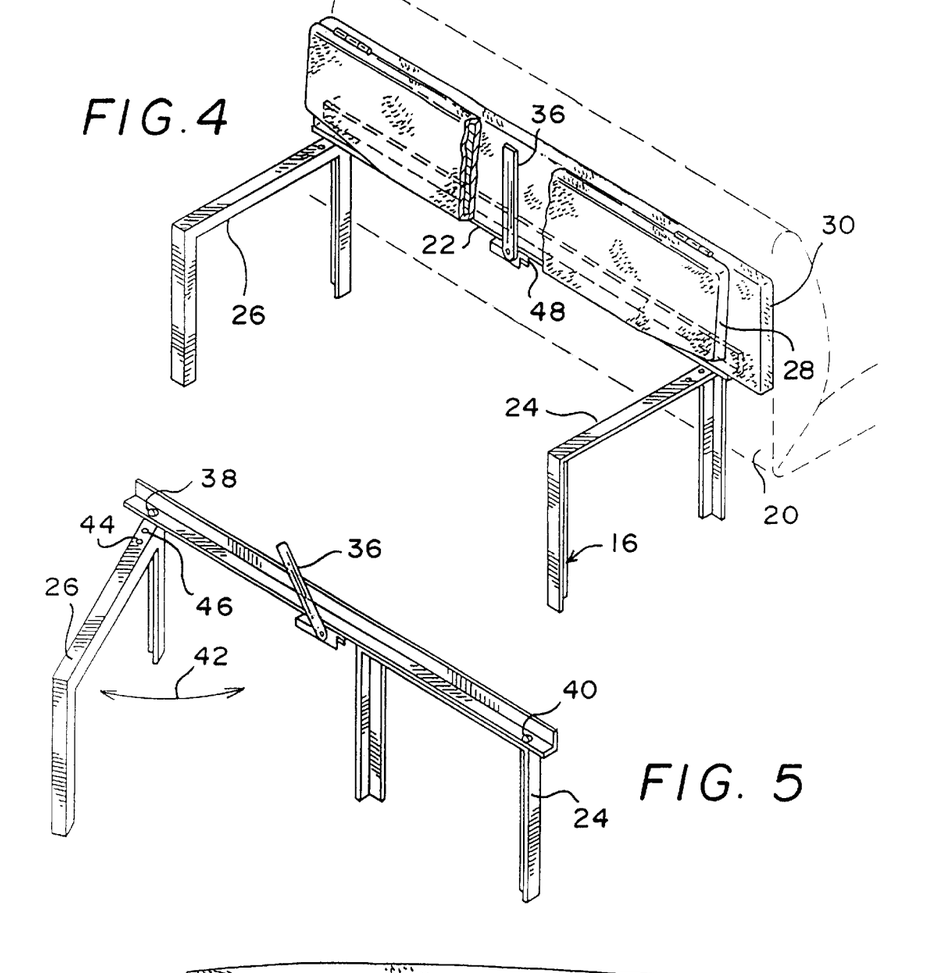
FIG. 4 is a perspective illustration of the cargo shelf assembly of the present invention, partially cut away to expose the elongated member and to show the spatial relationship of the present invention with the seat back of a vehicle, shown in phantom lines.
FIG. 5 is a perspective view of the frame assembly of the present invention, illustrating its collapsibility.

Referring now to FIG. 4, the removable frame assembly 16 may be readily seen in its position within the cargo area and adjacent the rear seat back 20 of the vehicle (not shown). The removable frame assembly 16 comprises a horizontal cross member 22 and a pair of inverted U-shaped leg assemblies 24, 26. Both the U-shaped leg assemblies 24, 26 and the horizontal cross member 22 preferably have L-shaped cross sections. The frame assembly 16 is preferably formed of a rigid metal. The removable frame assembly is free standing, that is, it is not attached to any vehicle structure.

FIGS. 7–10 illustrate a first embodiment of a platform assembly which, as mentioned above, is designated generally as 14. The platform assembly 14 includes two panels 28, 30 which are attached by two hinges 32, 34. The panels 28, 30 are preferably formed of wood partially or completely covered with carpet. Obviously, any suitable fabric materials may be utilized.

Referring now again to FIG. 1, it can be seen that in the first substantially horizontal position the panels 28, 30 rest on the U-shaped leg assemblies 24, 26.

Figure 2:
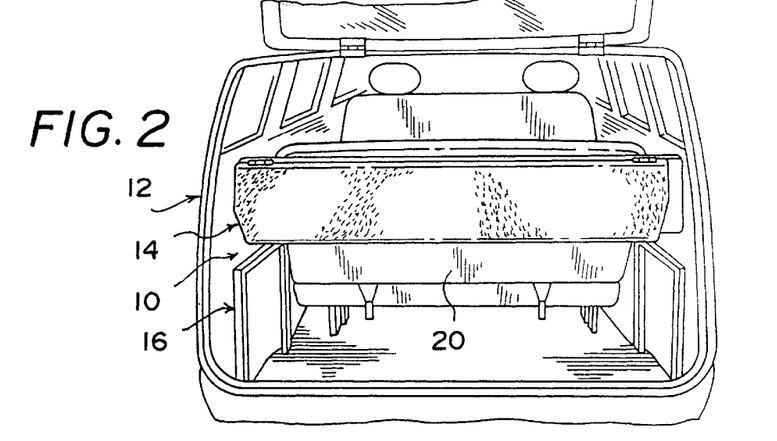
FIG. 2 is a rear view of the vehicle showing the removable cargo shelf assembly in a stowed position to accommodate tall items that are desired to be placed in the cargo space.

Referring now to FIG. 2, when the cargo space is desired to be made to accommodate tall items, the platform assembly 14 is folded to a stowed position. FIG. 4 shows the manner in which the platform assembly 14 is maintained in this stowed position. A retaining means or elongated member 36, which is rotatably attached to the cross member 22, supports the panel 30 in the stowed, upright position. The second panel 28 is maintained in the substantially vertical position by gravity.

Referring now to FIG. 5, it can be seen that the horizontal cross member 22 is secured by bolts 38, 40 to the upper surfaces of the inverted U-shaped leg assemblies 24, 26. This rotatable connection allows the frame assembly 16 to be collapsible, as shown by arrow 42. The inverted U-shaped leg assemblies preferably include a plurality of spaced attachment positions 44, 46 for maintaining the cross member 22 at a desired position along the upper horizontal surface to accommodate various cargo space dimensions. The elongated member 36 is secured by a bracket 48 to the bottom surface of the horizontal cross member 22. The vertical portion of the horizontal cross member 22 prevents undesired forward sliding of the platform assembly 14 relative to the frame assembly 16.

When the platform assembly 14 is returned to the horizontal position, the elongated member 36 is rotated downward to a horizontal position allowing the panels to again rest in their horizontal position.

Figure 6:
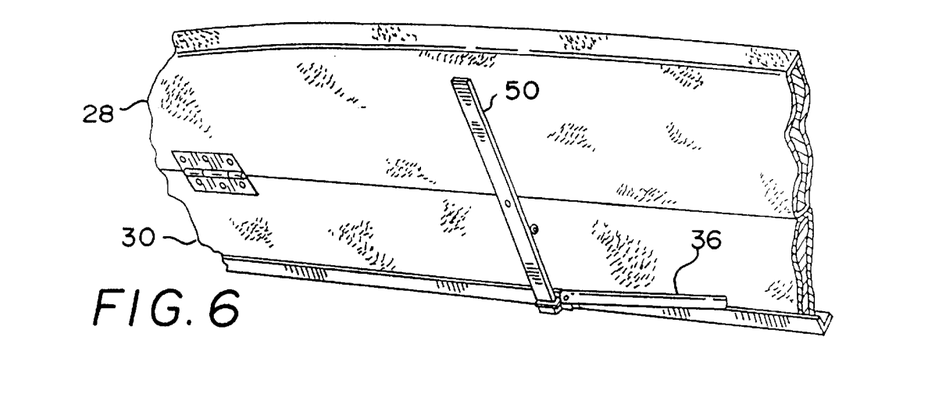
FIG. 6 is a bottom perspective view of the removable cargo shelf of the present invention, particularly showing utilization of the articulated support element.
Figures 7, 8:
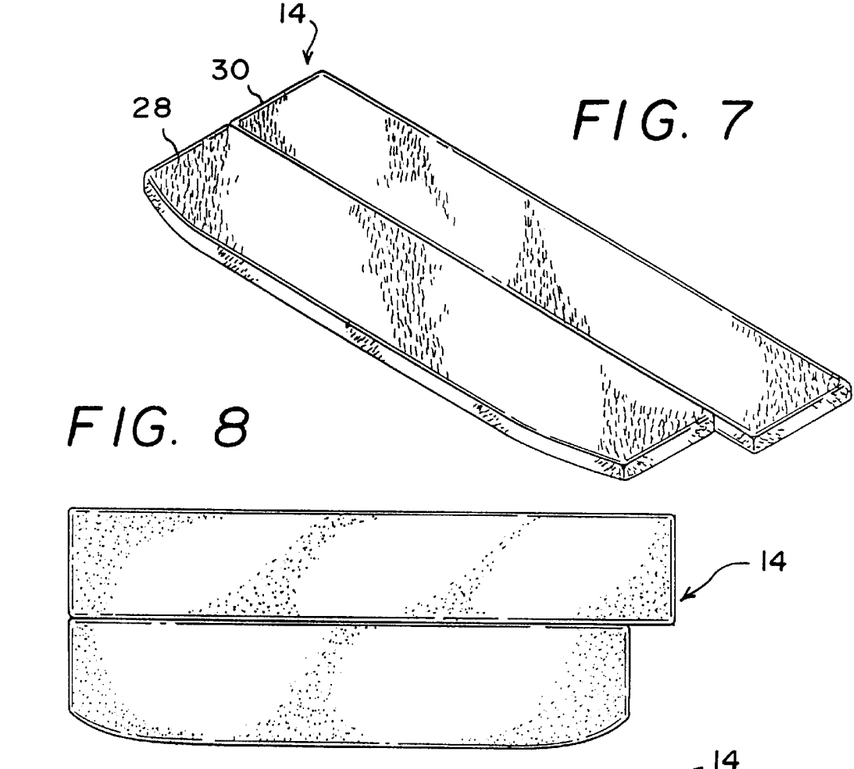
FIG. 7 is a top, right perspective view of a first embodiment of a platform assembly, in accordance with the principles of the present invention.
FIG. 8 is a top plan view of the platform assembly of FIG. 7.
Figures 9, 10:
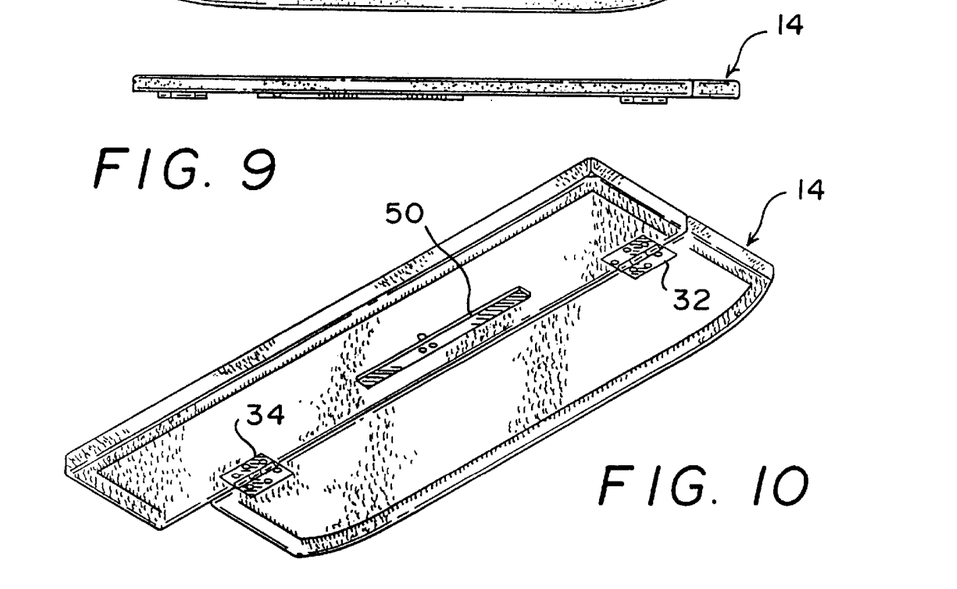
FIG. 9 is a front end view of the platform assembly of FIG. 7.
FIG. 10 is a bottom perspective view of the platform assembly of FIG. 7.
Figures 11, 12:
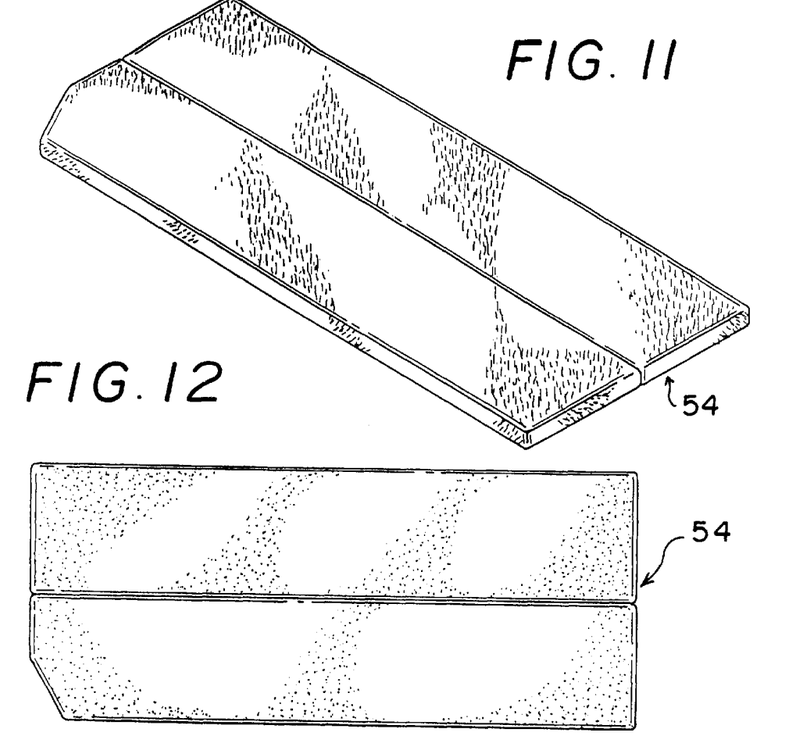
FIG. 11 is a top, right perspective view of a second embodiment of a platform assembly, in accordance with the principles of the present invention.
FIG. 12 is a top plan view of the platform assembly of FIG. 11.
Figure 13:
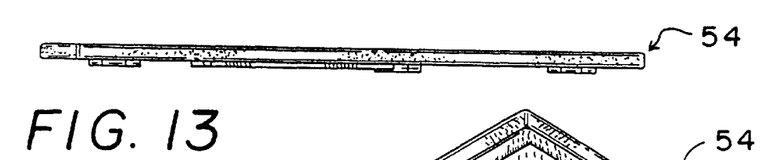
FIG. 13 is a front end view of the platform assembly of FIG. 11.
Figure 14:
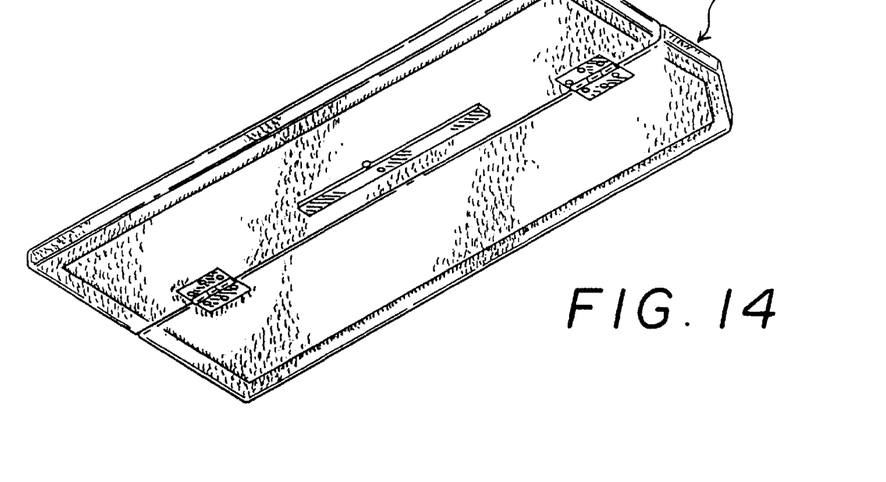
FIG. 14 is a bottom perspective view of the platform assembly of FIG. 11.
Figures 15, 16:
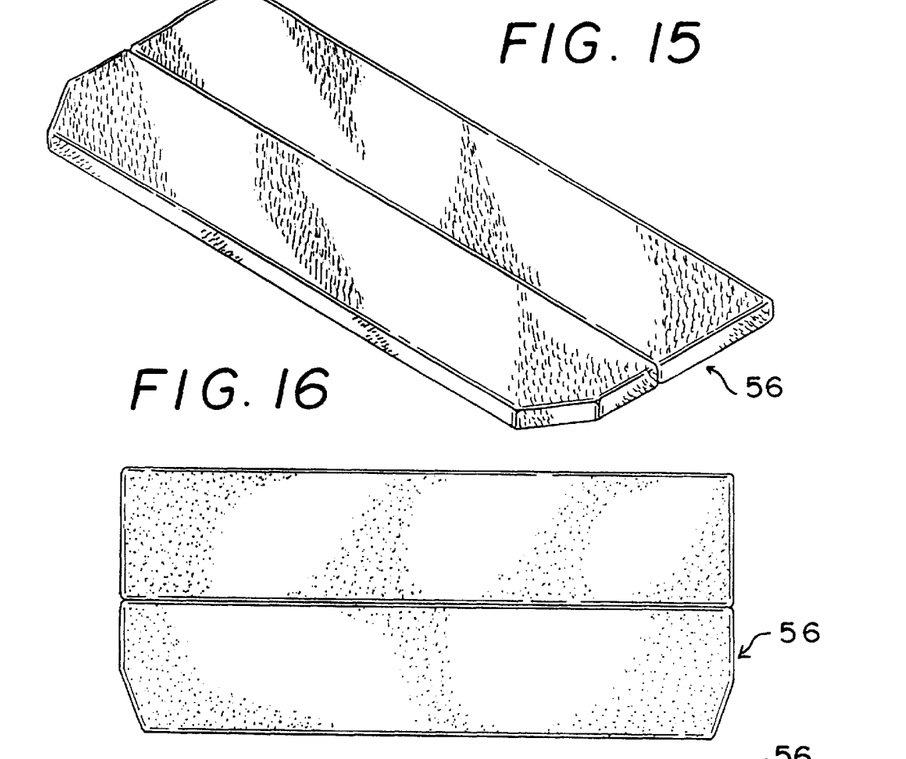
FIG. 15 is a top, right perspective view of a third embodiment of a platform assembly, in accordance with the principles of the present invention.
FIG. 16 is a top plan view of the platform assembly of FIG. 15.
Figures 17, 18:
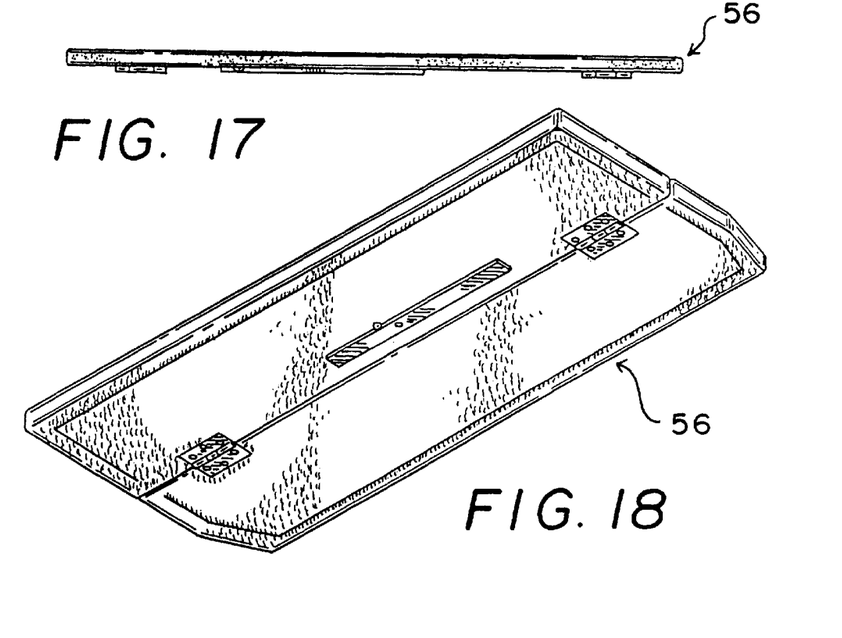
FIG. 17 is a front end view of the platform assembly of FIG. 15.
FIG. 18 is a bottom perspective view of the platform assembly of FIG. 15.
Figures 19, 20:
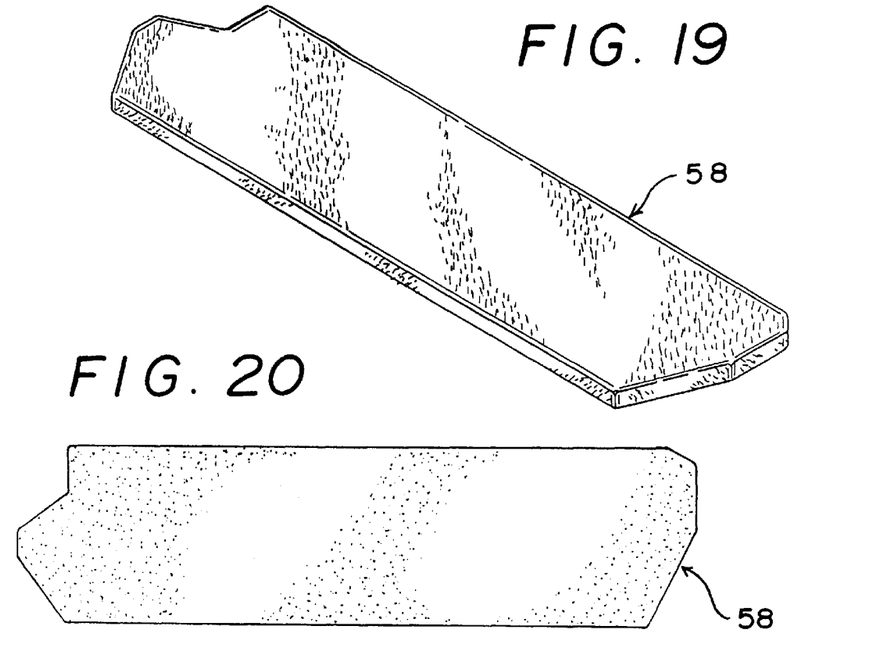
FIG. 19 is a top, right perspective view of a fourth embodiment of a platform assembly, in accordance with the principles of the present invention.
FIG. 20 is a top plan view of the platform assembly of FIG. 19.
Figure 21:
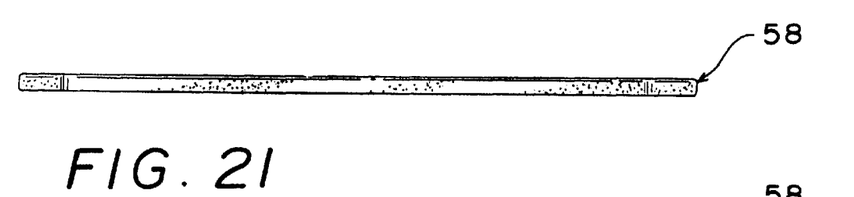
FIG. 21 is a front end view of the platform assembly of FIG. 19.
Figure 22:
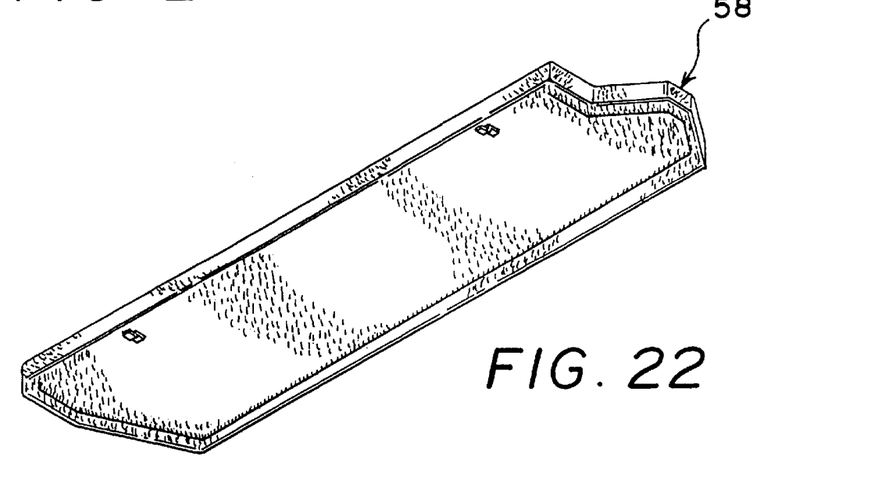
FIG. 22 is a bottom perspective view of the platform assembly of FIG. 19.
Figures 23, 24:
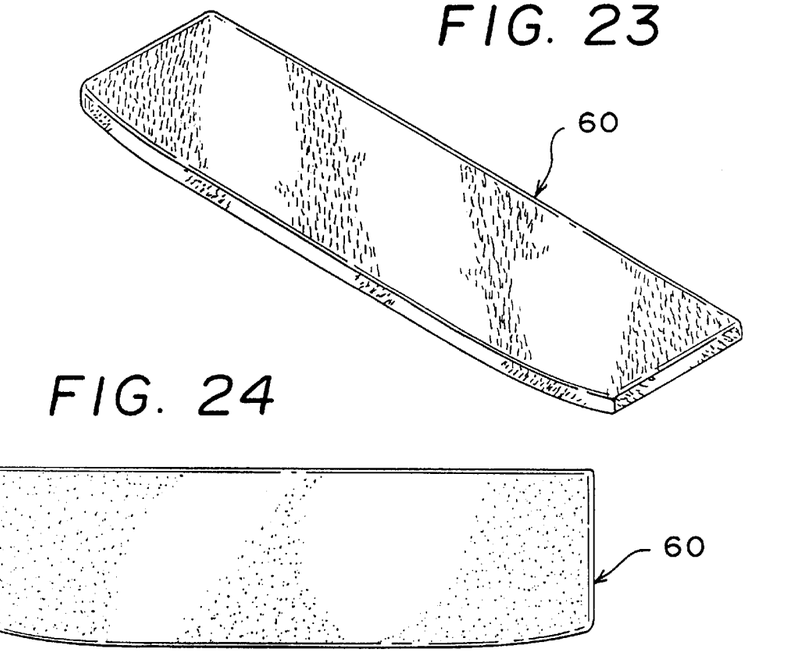
FIG. 23 is a top, right perspective view of a fifth embodiment of a platform assembly in accordance with the principles of the present invention.
FIG. 24 is a top plan view of the platform assembly of FIG. 23.
Figure 25:
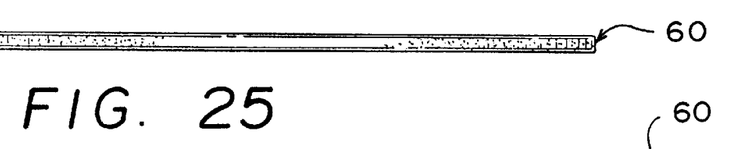
FIG. 25 is a front end view of the platform assembly of FIG. 23.
Figure 26:
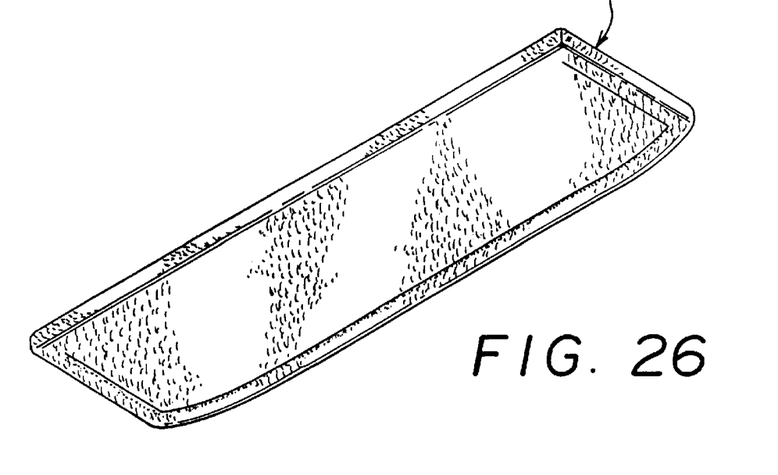
FIG. 26 is a bottom perspective view of the platform assembly of FIG. 23.

Referring now to FIG. 6, the platform assembly 14 includes an articulated support element 50 which is pivotly attached to panel 28 and rotatable thereto to engage panel 30 at a bottom surface thereof, thus maintaining the two panels 28, 30 in a planar orientation. The articulated support element 50 is further engageable with the underside of the horizontal cross member 22 to prevent undesired relative movement of the platform assembly and the frame assembly. A clip is preferably provided on the horizontal cross member 22 to maintain the articulated support element 50 in the proper engaged position.

Figure 3:
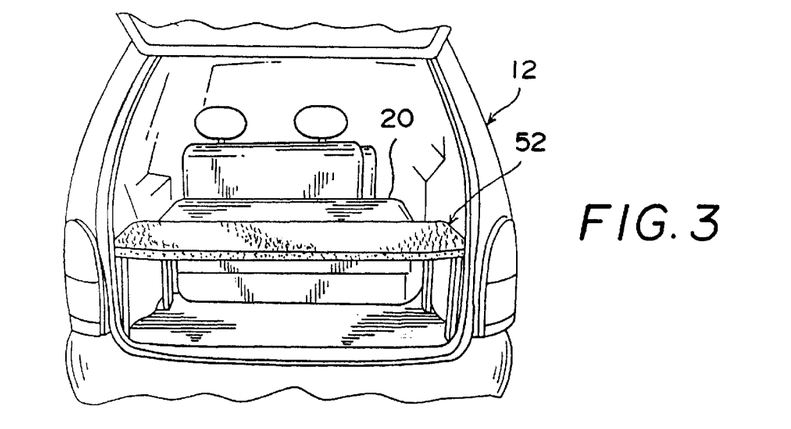
FIG. 3 is a rear view of a vehicle showing utilization of a single panel embodiment of the cargo shelf assembly of the present invention, the rear seat folded down to form, in combination with the cargo shelf assembly, a large platform.

Although the platform assembly has been described as including two panels, a platform assembly with a single panel may be utilized. Referring now to FIG. 3, such a single panel platform assembly is illustrated, designated generally as 52. Such a single panel platform assembly 52 may be utilized to accommodate the specific dimensions of a particular vehicle. FIG. 3 also illustrates another advantage of the present invention. This figure shows that the rear seat 20 of the vehicle 12, when folded, may, in conjunction with the horizontal surface of the cargo shelf assembly, provide a very large load platform.

The platform assembly 14 illustrated in FIGS. 7–10 includes a relatively long panel 30 and a shorter panel 28 which make it particularly adaptable for use with the Ford Windstar Mini-van.

Referring now to FIGS. 11–14, another two panel platform assembly is illustrated, designated generally as 54. Its shape is particularly suited to accommodate the cargo space of the 1996 Chrysler Corporation mini-van, long wheel base, with rear air conditioning.

Referring now to FIGS. 15–18, another two panel platform assembly is illustrated, designated generally as 56. This platform assembly is particularly adapted for use with the 1996 Chrysler Corporation mini-van, long wheel base, without rear air conditioning.

Referring now to FIGS. 19–22, a single panel platform assembly, designated generally as 58, is illustrated which is particularly suited for a 1996 Chrysler Corporation mini-van, short wheel base.

Referring now to FIGS. 23–26, another single panel platform assembly is illustrated, designated generally as 60. This platform assembly 60 is particularly suited for use with the Mercury Villager and the Nissan Quest.

Obviously, many modifications and variations of the present invention are possible in light of the above teachings. For example, although the removable frame assembly has been described as having L-shaped cross sections, obviously other shapes may be utilized to achieve similar utility such as the use of tubular framing, or box section tubing.

The removable cargo shelf assembly of the present invention may have configurations other than that shown herein which may accommodate the rear cargo space of vehicles not necessarily described herein.

It is, therefore, to be understood that within the scope of the appended claims, the invention may be practiced otherwise than as specifically described.

What is claimed and desired to be secured by Letters Patent of the United States is:

1. A removable cargo shelf assembly for a vehicle, comprising:
   a) a platform assembly including at least one panel;
   b) a removable frame assembly Including support means for maintaining said at least one panel in a first substantially horizontal position at a desired elevation relative to the floor of the vehicle, said removable frame assembly, comprising:
      i) a horizontal cross member; and
      ii) a pair of leg assemblies attached to said horizontal cross member, each leg assembly being rotatably adjustable to an operative position for supporting said at least one panel; and
   c) retaining means operably engageable with said at least one panel for maintaining said at least one panel in a second upright stowed position, wherein said retaining means comprises an elongated member rotatable adjustable from a first position to a second position, said first position allowing said at least one panel to be maintained in said horizontal position and said second position for maintaining said at least one panel in said second stowed position.

2. The removable cargo shelf assembly of claim 1, wherein said removable frame assembly is freestanding.

3. The removable cargo shelf assembly of claim 1, wherein said removable frame assembly is collapsible.

4. The removable cargo shelf assembly of claim 1, wherein said cross member has an L-shaped cross-section comprising a vertical portion and a horizontal portion, said vertical portion preventing undesired forward sliding of said platform assembly relative to said removable frame assembly.

5. The removable cargo shelf assembly of claim 1, wherein each pair of leg assemblies has an L-shaped cross-section.

6. The removable cargo shelf assembly of claim 5, wherein each leg assembly includes an upper horizontal surface including a plurality of spaced attachment positions for maintaining said cross member at a desired position along said upper horizontal surface to accommodate various cargo space dimensions.

7. The removable cargo shelf assembly of claim 1, wherein said platform assembly comprises a single panel.

8. The removable cargo shelf assembly of claim 1, wherein said platform assembly comprises two panels, said panels being hingedly connected.

9. The removable cargo shelf assembly of claim 8, wherein said platform assembly further includes an articulated support element pivotly attached to one of said two panels and rotatable to engage the other of said two panels for maintaining said two panels in a planer orientation.

10. The removable cargo shelf assembly of claim 9, wherein said articulated support element is further engageable with said frame assembly to prevent undesired relative movement of said platform assembly and said frame assembly.

11. The removable cargo shelf assembly of claim 1, wherein said platform assembly further includes an articulated support element pivotly attached to said at least one panel and rotatable to engage said removable frame assembly to prevent undesired relative movement of said platform assembly and frame assembly.

12. The removable cargo shelf assembly of claim 1 wherein each leg assembly has an inverted U-shape.

\* \* \* \* \*